United States Patent
Lin et al.

(10) Patent No.: US 8,786,815 B2
(45) Date of Patent: Jul. 22, 2014

(54) DRIVING CIRCUIT AND DISPLAY PANEL HAVING THE SAME

(75) Inventors: Chih-Hung Lin, Taoyuan County (TW); Wu-Liu Tsai, Hualien County (TW); Chuan-Sheng Wei, Taichung (TW); Che-Chia Chang, Taichung (TW); Sheng-Chao Liu, Hsinchu County (TW); Yu-Cheng Chen, Hsinchu (TW); Yi-Hui Li, New Taipei (TW); Maw-Song Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 258 days.

(21) Appl. No.: 13/330,627

(22) Filed: Dec. 19, 2011

(65) Prior Publication Data

US 2012/0092240 A1 Apr. 19, 2012

Related U.S. Application Data

(63) Continuation-in-part of application No. 13/030,133, filed on Feb. 18, 2011, now Pat. No. 8,456,582.

(30) Foreign Application Priority Data

Sep. 7, 2010 (TW) .............................. 99130234 A
Aug. 26, 2011 (TW) .............................. 100130713 A

(51) Int. Cl.
*G02F 1/133* (2006.01)
*G02F 1/1368* (2006.01)

(52) U.S. Cl.
USPC ................................ 349/151; 349/38; 349/43

(58) Field of Classification Search
USPC ............ 349/38, 39, 43, 138, 151; 257/59, 72; 345/92, 206
See application file for complete search history.

(56) References Cited

U.S. PATENT DOCUMENTS 6,124,153 A 9/2000 Lee et al.
6,198,133 B1 * 3/2001 Yamazaki et al. ............ 257/347
(Continued)

FOREIGN PATENT DOCUMENTS

CN 1964056 5/2007
TW 201013275 4/2010

OTHER PUBLICATIONS

"First Office Action of China Counterpart Application", issued on Sep. 17, 2013, p. 1-p. 9.

(Continued)

*Primary Examiner* — Dung Nguyen
*Assistant Examiner* — Tai Duong
(74) *Attorney, Agent, or Firm* — Jianq Chyun IP Office

(57) ABSTRACT

A display panel having a display region and a non-display region is provided. The display panel includes a plurality of pixel structures in the display region, and each pixel structure includes a scan line, a data line, a first active device, a pixel electrode, a first insulating layer, a capacitor electrode, and a second insulating layer. The first active device includes a first gate, a first channel, a first source, and a first drain. The second insulating layer covers the first insulating layer and the capacitor electrode and is located between the capacitor electrode and the first drain. At least one driving circuit is disposed in the non-display region and includes at least one second active device. Hence, a relatively thin insulating layer can be disposed between the capacitor electrode and the drain to reduce the area of the capacitor region and to achieve a desired aperture ratio.

7 Claims, 13 Drawing Sheets

(56) References Cited

U.S. PATENT DOCUMENTS

| | | |
|---|---|---|
| 7,532,263 B2 | 5/2009 | Lee et al. |
| 8,462,281 B2 | 6/2013 | Lee et al. |
| 2003/0059986 A1* | 3/2003 | Shibata ............ 438/149 |
| 2007/0103610 A1 | 5/2007 | Lee et al. |
| 2009/0002590 A1 | 1/2009 | Kimura |
| 2009/0166633 A1 | 7/2009 | Lee et al. |
| 2009/0269872 A1 | 10/2009 | Lee et al. |
| 2010/0182223 A1 | 7/2010 | Choi et al. |
| 2010/0283049 A1 | 11/2010 | Sato et al. |

OTHER PUBLICATIONS

"Office Action of Taiwan Counterpart Application", issued on Mar. 26, 2014, p. 1-p. 7, in which the listed foreign references were cited.

* cited by examiner

DRIVING CIRCUIT AND DISPLAY PANEL HAVING THE SAME

CROSS-REFERENCE TO RELATED APPLICATION

This application is a continuation-in-part application of and claims the priority benefit of a prior application Ser. No. 13/030,133, filed on Feb. 18, 2011. The prior application Ser. No. 13/030,133 claims the priority benefit of Taiwan application serial no. 99130234, filed on Sep. 7, 2010. This application also claims the priority benefit of a Taiwan application serial no. 100130713, filed on Aug. 26, 2011. The entirety of each of the above-mentioned patent applications is hereby incorporated by reference herein and made a part of this specification.

BACKGROUND OF THE INVENTION

1. Field of the Invention

The present invention relates to an active device, a pixel structure having the active device, and a display panel having the pixel structures.

2. Description of Related Art

In general, a pixel structure of a liquid crystal display (LCD) includes an active device and a pixel electrode. The active device serves as a switch element of an LCD display unit. To control each individual pixel structure, a certain pixel is usually selected by a corresponding scan line and a corresponding data line, and display data corresponding to the certain pixel are displayed through providing an appropriate operating voltage. The pixel structure further includes a storage capacitor, such that the pixel structure can be equipped with voltage-retaining functions. Namely, the storage capacitor can store the applied operating voltage to stabilize the display image of the pixel structure.

To form the storage capacitor in the pixel structure, a capacitor electrode is often required in the pixel structure. However, if the area of the capacitor electrode is expanded in order to increase the capacitance of the storage capacitor, the aperture ratio of the pixel structure is reduced.

At present, the capacitor electrode is designed to be located below the data line in the pixel structure according to the related art, so as to increase the aperture ratio of the pixel structure. The capacitor electrode and the data line that are overlapped to increase the loading of the pixel structure, and thereby the power supply for driving the display panel needs to be increased, which leads to an increase in power consumption.

SUMMARY OF THE INVENTION

The present invention is directed to an active device, a pixel structure having the active device, a driving circuit and a display panel, wherein a capacitor electrode is designed to ensure the high aperture ratio of the pixel structure without increasing the loading of the pixel structure.

The present invention provides a pixel structure that includes a scan line, a data line, a first active device, a first insulating layer, a pixel electrode, a capacitor electrode, and a second insulating layer. The first active device includes a first gate, a first channel, a first source, and a first drain. The first gate is electrically connected to the scan line, and the first source is electrically connected to the data line. The first insulating layer is located between the gate and the channel. The pixel electrode is electrically connected to the first drain. The capacitor electrode is disposed on the first insulating layer. The second insulating layer covers the first insulating layer and the capacitor electrode and is located between the capacitor electrode and the drain.

The present invention further provides a display panel having a display region and a non-display region, and the display region and the non-display region are not overlapped to each other. The display panel comprises a plurality of pixel structures and at least one driving circuit. The pixel structures as above described are disposed in the display region. The driving circuit is disposed in the non-display region and comprises at least one second active device, wherein the second active device comprises a second gate, a second channel, a second source and a second drain. The second gate is disposed on the first insulating layer, and the second insulating layer covers the second gate. The second channel is located on the first insulating layer above the second gate. The second source and the second drain are disposed on the second channel.

The present invention further provides a driving circuit comprising a first gate; a first insulating layer covering the first gate; a second gate disposed on the first insulating layer; a second insulating layer covering the first insulating layer and the second gate; a first channel disposed on the second insulating layer above the first gate; a second channel disposed on the second insulating layer above the second gate; a first source and a first drain located on the first channel; and a second source and a second drain located on the second channel.

The present invention further provides an active device that includes a gate, a channel, a first insulating layer, a source, a drain, a capacitor electrode, and a second insulating layer. The first insulating layer is located between the gate and the channel. The source and the drain are located above the channel. The capacitor electrode is disposed on the first insulating layer. The second insulating layer is located between the capacitor electrode and the drain.

Based on the above, the capacitor electrode of the present invention is located on the first insulating layer, and the second insulating layer is located between the capacitor electrode and the drain. Hence, the capacitor electrode and the drain together constitute a capacitor. A relatively thin insulating layer can be disposed between the capacitor electrode and the drain, and therefore the area of the capacitor region in the pixel structure can be reduced by placing the pixel electrode. As such, the pixel structure can have the desired aperture ratio. On the other hand, the capacitor coupling portion of the capacitor electrode is not overlapped with the data line in the present invention, and therefore the design of the capacitor electrode does not increase the loading of the pixel structure.

In order to make the aforementioned and other features and advantages of the present invention comprehensible, embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

First Embodiment

Figure 1A:
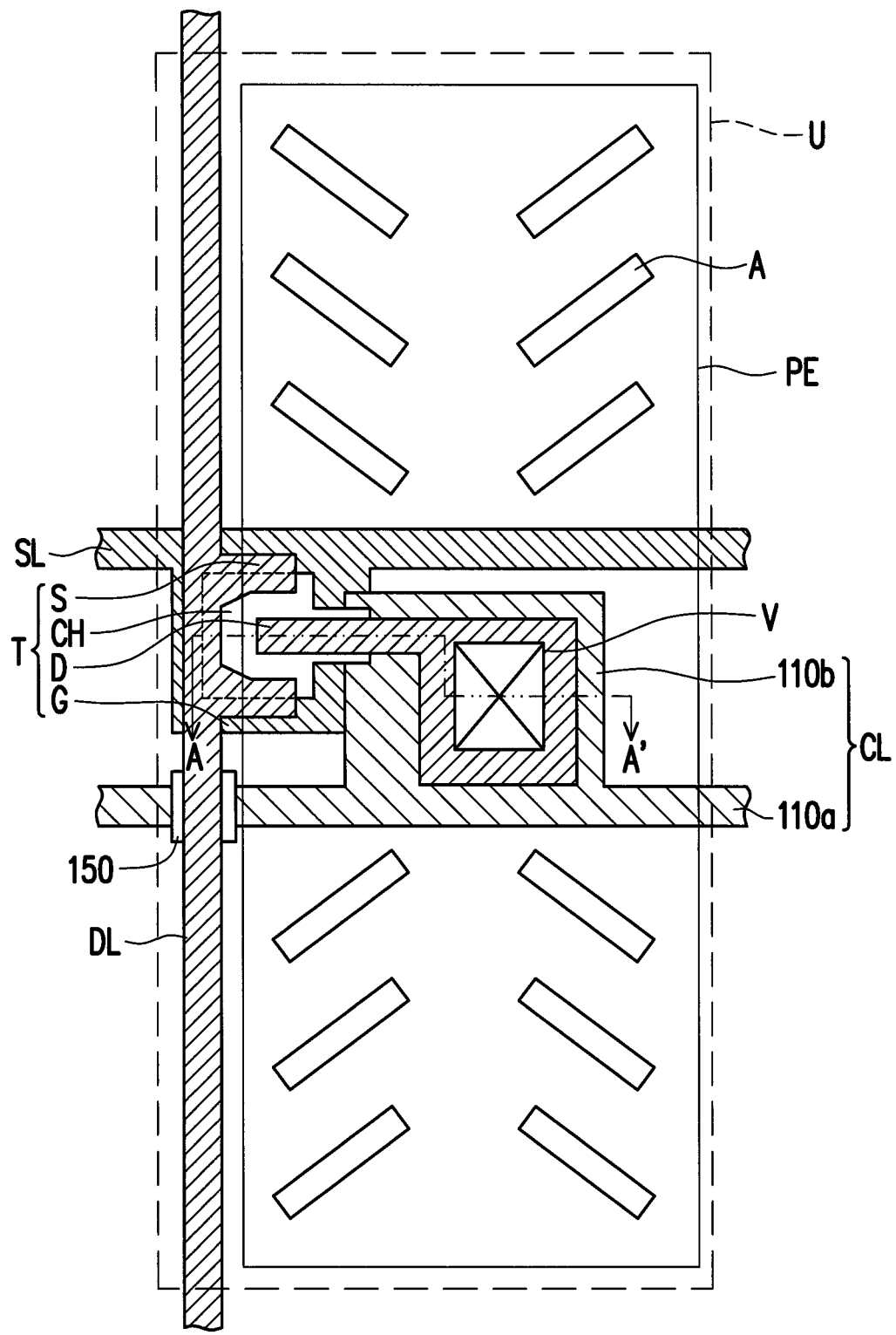
FIG. 1A is a schematic top view illustrating a pixel structure according to an embodiment of the present invention.
Figure 1B:
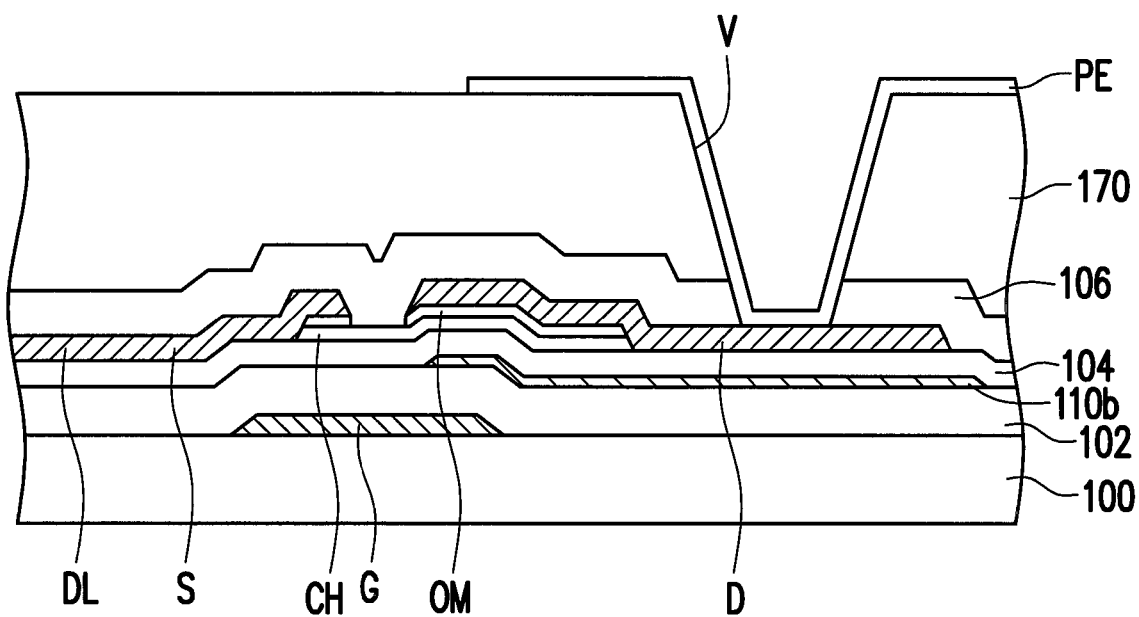
FIG. 1B is a schematic cross-sectional view taken along a sectional line A-A' depicted in FIG. 1A.

FIG. 1A is a schematic top view illustrating a pixel structure according to an embodiment of the present invention. FIG. 1B is a schematic cross-sectional view taken along a sectional line A-A' depicted in FIG. 1A. With reference to FIG. 1A and FIG. 1B, the pixel structure of this embodiment includes a substrate 100 on which a scan line SL, a data line DL, an active device T, first insulating layer 102, a pixel electrode PE, and a capacitor electrode CL, and a second insulating layer 104 are disposed.

The substrate 100 has a pixel region U thereon, and each pixel region U has a pixel structure therein. The substrate 100 can be made of glass, quartz, an organic polymer, a non-light-transmissive/reflective material (such as a conductive material, wafer, ceramics, or any other suitable material), or any other suitable material. The scan line SL and the data line DL are disposed on the substrate 100.

The scan line SL crosses over the data line DL. In other words, an extending direction of the data line DL is not parallel to an extending direction of the scan line SL. Preferably, the extending direction of the data line DL is substantially perpendicular to the extending direction of the scan line SL. In addition, the scan line SL and the data line DL are in different film layers, and a first insulating layer 102 and a second insulating layer 104 are disposed between the scan line SL and the data line DL. In consideration of electrical conductivity, the scan line SL and the data line DL are normally made of metallic materials. However, the present invention is not limited thereto. According to other embodiments, the scan line SL and the data line DL can also be made of other conductive materials. The metallic material is, for example, an alloy, metal nitride, metal oxide, metal oxynitride, another appropriate material, or a layer in which the metal material and any other conductive material are stacked to each other.

The active device T includes a gate G, a channel CH, a source S, and a drain D. The gate G is electrically connected to the scan line SL, and the source S is electrically connected to the data line DL. According to this embodiment, the gate G is disposed on the substrate 100, and the gate G and the scan line SL are in the same film layer. A material of the gate G is the same as or similar to the material of the scan line SL. The channel CH is located on the second insulating layer 104 above the gate G. A material of the channel CH is, for instance, amorphous silicon, polysilicon, metal oxide semiconductor, or any other semiconductor material. The source S and the drain D are located at respective sides of the channel CH. In this embodiment, the source S, the drain D, and the data line DL are in the same film layer, which means the source S, the drain D, and the data line DL are formed by patterning a film layer, and materials of the source S, the drain, and the data line DL are the same or similar. Given the channel CH is made of amorphous silicon in an embodiment of the present invention, an ohmic contact layer OM can be further placed between the channel CH and the source S and the drain D, and the channel CH can be made of doped amorphous silicon.

The capacitor electrode CL is substantially located above the gate G and below the drain D. That is to say, the film layer where the capacitor electrode CL is located is between the film layer where the gate G is located and the film layer where the drain D is located. In this embodiment, the capacitor electrode CL includes a connecting portion 110a and a capacitor coupling portion 110b. An overlapping region between the capacitor coupling portion 110b and the drain D is where the storage capacitor of the pixel structure is formed. Namely, the capacitor coupling portion 110b acts as the lower electrode of the storage capacitor, and the drain D acts as the upper electrode of the storage capacitor. Besides, the connecting portion 110a and the capacitor coupling portion 110b are connected, and the connecting portion 110a extends to the periphery of the substrate 110. The extended connecting portion 110a at the periphery of the substrate 110 is electrically connected to the common voltage Vcom. Similarly, in consideration of electrical conductivity, the capacitor electrode CL is normally made of metallic materials. However, the capacitor electrode CL can also be made of other conductive materials in other embodiments, which should not be construed as a limitation to the present invention. The metallic material is, for example, an alloy, metal nitride, metal oxide, metal oxynitride, another appropriate material, or a layer in which the metal material and any other conductive material are stacked to each other.

According to this embodiment, an extending direction of the connecting portion 110a of the capacitor electrode CL is substantially parallel to the extending direction of the scan line SL. An extending direction of the capacitor coupling portion 110b of the capacitor electrode CL is substantially perpendicular to the connecting portion 110a. In each of the pixel structures of the embodiment, the capacitor coupling portion 110b extends from the connecting portion 110a to the scan line SL. Besides, in this embodiment, the capacitor electrode CL is overlapped with a portion of the gate G. In detail, the capacitor coupling portion 110b of the capacitor electrode CL and the gate G are partially overlapped. The connecting portion 110a of the capacitor electrode CL and the data line DL are partially overlapped.

In this embodiment, a pad layer 150 can be further disposed at the overlapping region between the data line DL and the capacitor electrode CL. The pad layer 150, for instance, includes a channel material layer (not shown) and an ohmic contact material layer (not shown), which is similar to the pad layer 160 composed of a channel material layer 160a and an ohmic contact material layer 160b as indicated in FIG. 2B. That is to say, the channel material layer 150a is defined (formed) when the channel CH is formed, and the ohmic contact material layer 150b is defined (formed) when the ohmic contact layer OM is formed. The pad layer 150 disposed between the data line DL and the capacitor electrode CL can prevent current leakage that occurs in the overlapping region between the data line DL and the capacitor electrode CL. Note that the material of the pad layer 150 is not limited in the present invention. The pad layer 150 can also be made of other materials in other embodiments of the present invention.

According to this embodiment as shown in FIG. 1B, the first insulating layer 102 and the second insulating layer 104 are disposed between the gate G and the channel CH, and the first insulating layer 102 and the second insulating layer 104 between the gate G and the channel CH serve as a gate insulating layer of the active device T. In addition, the second insulating layer 104 is disposed between the capacitor electrode CL (the capacitor coupling portion 110b) and the drain D, and the second insulating layer 104 between the capacitor electrode CL (the capacitor coupling portion 110b) and the drain D serves as a capacitor dielectric layer. The insulating layer 102 and the second insulating layer 104 respectively include silicon oxide, silicon nitride, silicon oxynitride, or any other appropriate dielectric material. Particularly, the thickness of the second insulating layer 104 is smaller than the thickness of the first insulating layer 102. Here, the thickness of the second insulating layer 104 (the capacitor dielectric layer) is about 700 angstroms to about 1500 angstroms, and a total thickness of the first insulating layer 102 and the second insulating layer 104 (the gate insulating layer) is about 3300 angstroms to about 5100 angstroms, for instance.

The pixel electrode PE is electrically connected to the drain D of the active device T. Here, the pixel electrode PE can be a transparent pixel electrode, a reflective pixel electrode, or a combination thereof. A material of the transparent pixel electrode includes metal oxide, such as indium tin oxide (ITO), indium zinc oxide (IZO), aluminum tin oxide (ATO), aluminum zinc oxide (AZO), indium germanium zinc oxide, other suitable oxide, or a layer in which at least two of the above materials are stacked. A material of the reflective pixel electrode is a metallic material with high reflectivity, for instance.

According to this embodiment, the connecting portion 110a of the capacitor electrode CL and the pixel electrode PE are partially overlapped. The pixel electrode PE of this embodiment further includes a plurality of alignment patterns A, e.g., alignment slits. However, the present invention is not limited thereto. According to other embodiments of the present invention, the alignment patterns A may not be formed in the pixel electrode PE.

In this embodiment, as indicated in FIG. 1B, passivation layers 106 and 170 are further disposed between the pixel electrode PE and the active device T (the source S and the drain D). The passivation layers 106 and 170 have a contact opening V, such that the pixel electrode PE is electrically connected to the drain D. The passivation layer 106 is normally referred to as the protection layer and can be made of silicon oxide, silicon nitride, silicon oxynitride, or any other appropriate dielectric material. The passivation layer 170 is referred to as the planarization layer and can be made of an inorganic insulating material, an organic insulating material, or an organic photo-sensitive material, for instance.

Note that the data line DL in the pixel structure shown in FIG. 1A is disposed on the edge of the pixel region U. The scan line SL, the active device T, and the capacitor electrode CL are disposed in the middle of the pixel region U. However, the locations of the scan line SL, the data line DL, the active device T, and the capacitor electrode CL in the pixel region U are not limited in the present invention.

According to an embodiment of the present invention, the pad layer 150 can be further disposed at the overlapping region between the data line DL and the capacitor electrode CL. The pad layer 150 can be defined when the channel CH and the ohmic contact layer OM are formed. The pad layer 150 is disposed in order to prevent short circuit or current leakage at the overlapping region between the data line DL and the capacitor electrode CL.

In the pixel structure depicted in FIG. 1A and FIG. 1B, the capacitor coupling portion 110b of the capacitor electrode CL is overlapped with the channel CH or/and partially overlapped with the gate G. Since the capacitor coupling portion 110b of the capacitor electrode CL and the channel CH are overlapped, short circuit or current leakage between the capacitor coupling portion 110b of the capacitor electrode CL and the drain D can be better prevented by the channel CH.

Figure 2A:
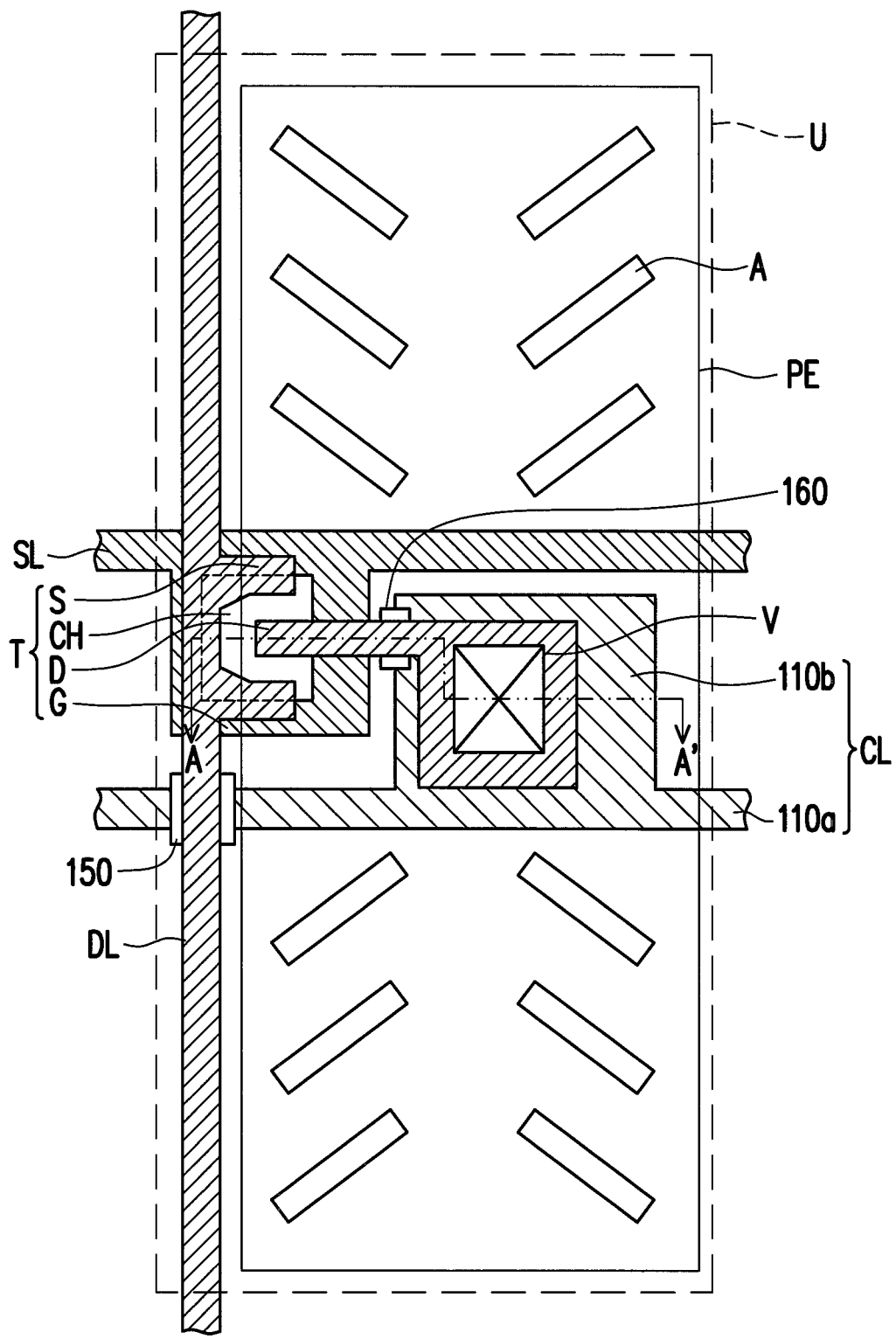
FIG. 2A is a schematic top view illustrating a pixel structure according to an embodiment of the present invention.
Figure 2B:
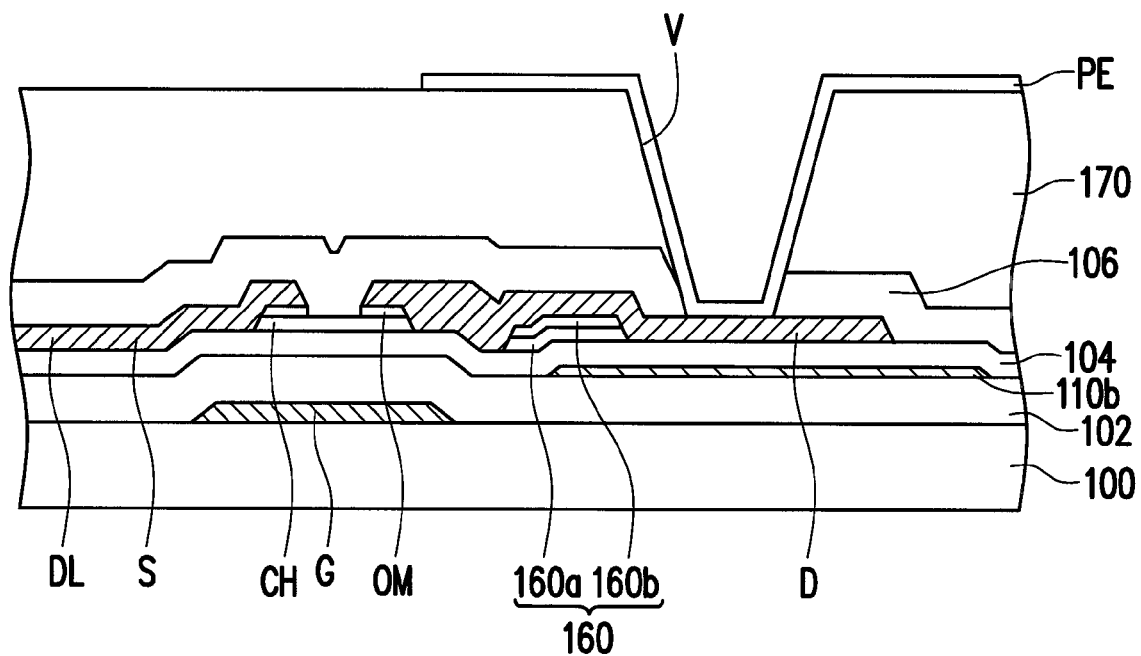
FIG. 2B is a schematic cross-sectional view taken along a sectional line A-A' depicted in FIG. 2A.

In other embodiments of the present invention, it is likely for the capacitor electrode not to be overlapped with the gate, as indicated in FIG. 2A and FIG. 2B. FIG. 2A is a schematic top view illustrating a pixel structure according to an embodiment of the present invention. FIG. 2B is a schematic cross-sectional view taken along a sectional line A-A' depicted in FIG. 2A.

The embodiment depicted in FIG. 2A and FIG. 2B is similar to the embodiment depicted in FIG. 1A and FIG. 1B; therefore, the same elements in FIG. 1A, FIG. 1B and FIG. 2A, FIG. 2B are represented by the same reference numbers and repetitive descriptions of these elements are omitted hereinafter. The difference between the embodiment depicted in FIG. 2A and FIG. 2B and the embodiment depicted in FIG. 1A and FIG. 1B lies in that the capacitor electrode CL is not overlapped with the gate G and the channel CH in this embodiment. In detail, the capacitor coupling portion 110b of the capacitor electrode CL is not overlapped with the gate G and the channel CH.

Since the capacitor coupling portion 110b of the capacitor electrode CL is not overlapped with the gate G and the channel CH, a pad layer 160 can be further disposed at the overlapping region between the drain D and the capacitor electrode CL. The pad layer 160 includes a lower pad layer 160a and an upper pad layer 160b. A material of the lower pad layer 160a is the same as the material of the channel CH, and a material of the upper pad layer 160b is the same as the material of the ohmic contact layer OM, for instance. The pad layer 160 disposed at the overlapping region between the drain D and the capacitor electrode CL can prevent short circuit or current leakage at the overlapping region.

According to the present embodiment, the capacitor electrode CL is located between the gate G and the drain D, and the overlapping region between the capacitor coupling portion 110b of the capacitor electrode CL and the drain D is where the storage capacitor of the pixel structure is formed. The gate G and the drain D of the active device T are located at the non-light-transmissive region. Hence, compared to the capacitor electrode in the conventional storage capacitor, the capacitor electrode CL of the present embodiment can ensure the desired aperture ratio of the pixel structure. Moreover, the capacitor electrode CL disposed between the gate G and the drain D is conducive to reduction of parasitic capacitance Cgd between the gate G and the drain D. Thereby, the coupling effect occurring between the gate G and the drain D can be mitigated, and the display quality of the image can be improved, e.g., flickers can be reduced.

In the present embodiment, the thickness of the second insulating layer 104 (the capacitor dielectric layer) is about 700 angstroms to about 1500 angstroms and is much smaller than the total thickness of the first insulating layer 102 and the second insulating layer 104 (the gate insulating layer). As a result, the second insulating layer 104 (the capacitor dielectric layer) is thin enough, such that the storage capacitor can have sufficient storage capacitance even through the area of the capacitor electrode CL is reduced for the purpose of increasing the aperture ratio of the pixel structure.

The capacitor electrode CL is located between the gate G and the drain D and covers a portion of the gate G. Accordingly, the capacitor electrode CL can block light that comes from the back side of the substrate 100, e.g., the light of the backlight module, so as to effectively decrease the photo current leakage generated when the channel CH is irradiated by the light from the backlight source.

In the previous two embodiments, the capacitor coupling portion 110b of the capacitor electrode CL is located close to the active device T. However, the present invention is not limited thereto. In other embodiments of the present invention, the capacitor coupling portion 110b of the capacitor electrode CL can be disposed far away from the active device T, as indicated in FIG. 3A and FIG. 3B.

Figure 3A:
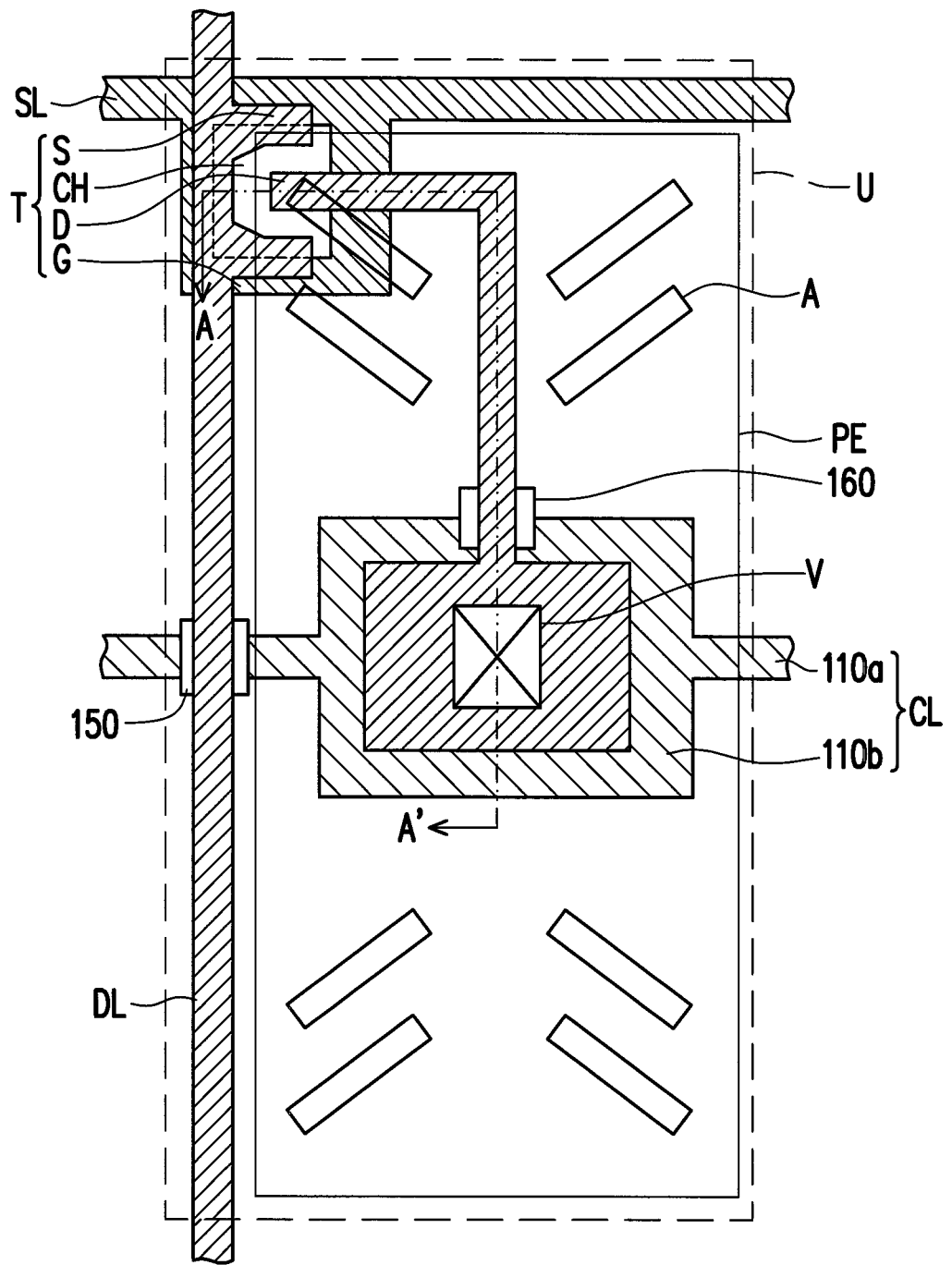
FIG. 3A is a schematic top view illustrating a pixel structure according to an embodiment of the present invention.
Figure 3B:
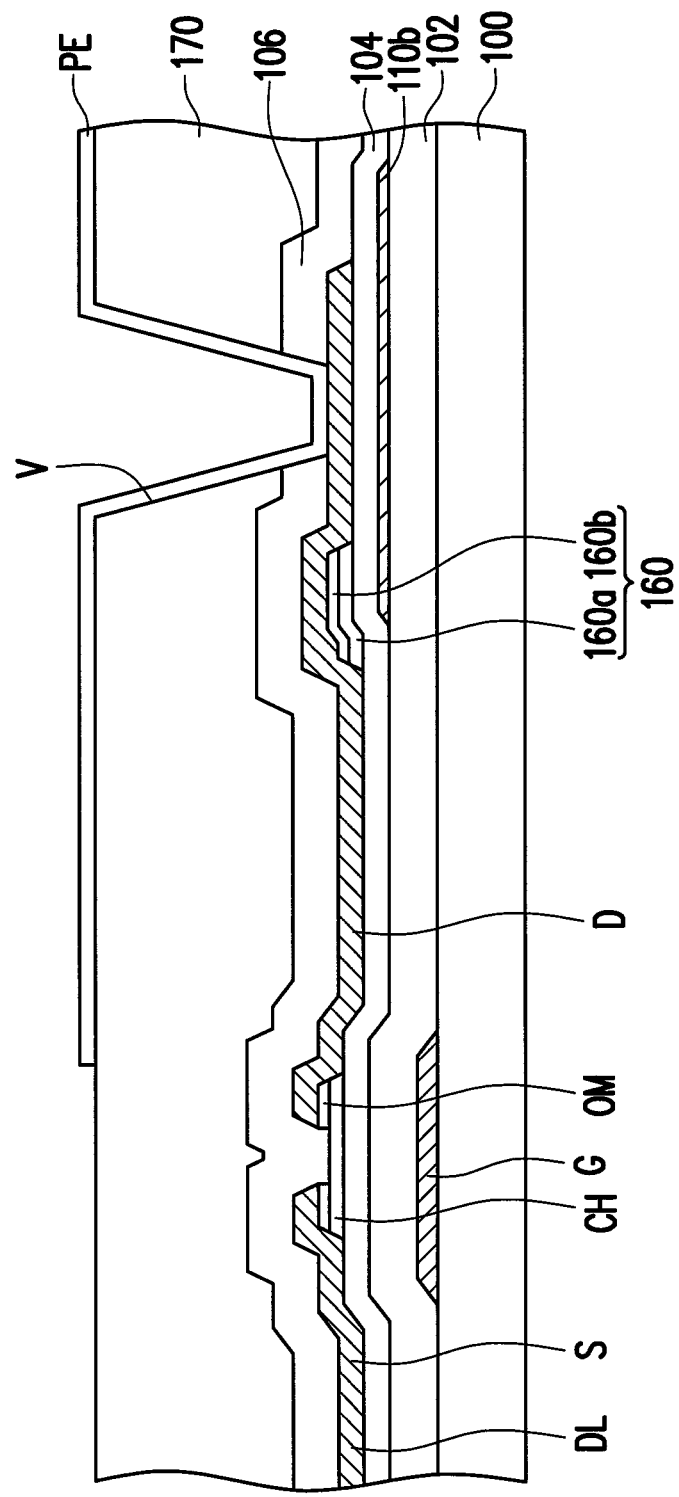
FIG. 3B is a schematic cross-sectional view taken along a sectional line A-A' depicted in FIG. 3A.

FIG. 3A is a schematic top view illustrating a pixel structure according to an embodiment of the present invention. FIG. 3B is a schematic cross-sectional view taken along a sectional line A-A' depicted in FIG. 3A. The embodiment depicted in FIG. 3A and FIG. 3B is similar to the embodiment depicted in FIG. 2A and FIG. 2B; therefore, the same elements in FIG. 2A, FIG. 2B and in FIG. 3A, FIG. 3B are represented by the same reference numbers, and repetitive descriptions of these elements are omitted hereinafter. The difference between the embodiment depicted in FIG. 3A and FIG. 3B and the embodiment depicted in FIG. 2A and FIG. 2B lies in that the active device T is disposed on the edge of the pixel region U, and the capacitor electrode CL is disposed in the middle of the pixel region U. Therefore, the capacitor electrode CL is not disposed close to the active device T.

Since the capacitor coupling portion 110b of the capacitor electrode CL is not overlapped with the gate G and the channel CH, the pad layer 160 can be further disposed at the overlapping region between the drain D and the capacitor electrode CL. The pad layer 160 includes a lower pad layer 160a and an upper pad layer 160b. A material of the lower pad layer 160a is the same as the material of the channel CH, and a material of the upper pad layer 160b is the same as the material of the ohmic contact layer OM, for instance. The pad layer 160 disposed at the overlapping region between the drain D and the capacitor electrode CL can prevent short circuit or current leakage at the overlapping region.

Figure 4:
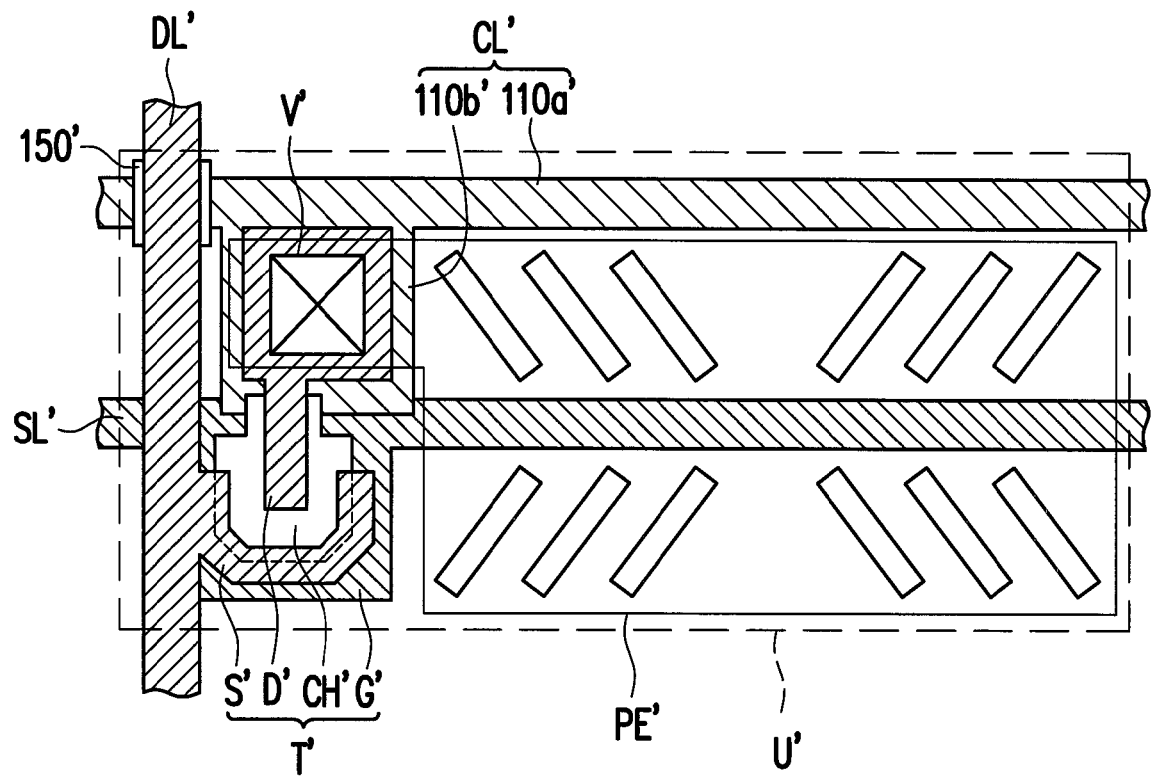
FIG. 4 is a schematic top view illustrating a pixel structure according to an embodiment of the present invention.

The design of the capacitor electrode CL between the gate G and the drain D can be further applied to other pixel structures in addition to the above-mentioned pixel structures, which is exemplarily shown in FIG. 4. The pixel structure depicted in FIG. 4 is similar to the pixel structure depicted in FIG. 1, while the main difference therebetween lies in that the pixel structure in FIG. 4 is a lateral pixel structure, and the scan line is in the middle of the pixel region and across the pixel region. The same elements in FIG. 1 and FIG. 4 are represented by the similar reference numbers.

With reference to FIG. 4, the pixel structure of this embodiment is in the pixel region U', and the pixel structure includes the scan line SL', the data line DL', the active device T', the pixel electrode PE', and the capacitor electrode CL'.

The scan line SL' crosses over the data line DL'. In other words, an extending direction of the data line DL' is not parallel to an extending direction of the scan line SL'. Preferably, the extending direction of the data line DL' is substantially perpendicular to the extending direction of the scan line SL'. A material of the scan line SL' and the data line DL' can be the same as or similar to the material of the scan line SL and the data line DL depicted in FIG. 1.

The active device T' includes a gate G', a channel CH', a source S', and a drain D'. The gate G' is electrically connected to the scan line SL', and the source S' is electrically connected to the data line DL'. Similarly, the materials of the gate G', the channel CH', the source S', and the drain D' can be the same as or similar to the materials of the gate G, the channel CH, the source S, and the drain D depicted in FIG. 1.

The capacitor electrode CL' is located between the gate G' and the drain D'. In this embodiment, the capacitor electrode CL' includes a connecting portion 110a' and a capacitor coupling portion 110b'. An overlapping region between the capacitor coupling portion 110b' and the drain D' is where the storage capacitor of the pixel structure is formed. Namely, the capacitor coupling portion 110b' acts as the lower electrode of the storage capacitor, and the drain D' acts as the upper electrode of the storage capacitor. The connecting portion 110a' is connected to the capacitor coupling portion 110b', and the connecting portion 110a' is electrically connected to the common voltage Vcom. The material of the capacitor electrode CL' can be the same as or similar to the material of the capacitor electrode CL depicted in FIG. 1.

Similarly, the extending direction of the connecting portion 110a' of the capacitor electrode CL' is substantially parallel to the extending direction of the scan line SL'. The extending direction of the capacitor coupling portion 110b' of the capacitor electrode CL' is substantially perpendicular to the connecting portion 110a'. In each of the pixel structures of this embodiment, the capacitor coupling portion 110b' extends from the connecting portion 110a' to the scan line SL'. Besides, according to this embodiment, the capacitor electrode CL' is overlapped with a portion of the gate G'. In detail, the capacitor coupling portion 110b' of the capacitor electrode CL' and the gate G' are partially overlapped. Additionally, the connecting portion 110a' of the capacitor electrode CL' and the data line DL' are partially overlapped.

In this embodiment, a pad layer 150' can be further disposed at the overlapping region of the data line DL' and the capacitor electrode CL'. The pad layer 150' includes the channel material layer (not shown) and the ohmic contact material layer (not shown), for instance. The pad layer 150' disposed between the data line DL' and the capacitor electrode CL' can prevent current leakage that occurs in the overlapping region of the data line DL' and the capacitor electrode CL'.

The pixel electrode PE' is electrically connected to the drain D' of the active device T'. Here, the pixel electrode PE' can be a transparent pixel electrode, a reflective pixel electrode, or a combination thereof.

Similarly, in the pixel structure depicted in FIG. 4, the first insulating layer and the second insulating layer are disposed between the gate G' and the channel CH'. The second insulating layer is disposed between the capacitor electrode CL' (the capacitor coupling portion 110b') and the drain D'. The thickness of the second insulating layer is about 700 angstroms to 1500 angstroms, and the total thickness of the first insulating layer and the second insulating layer is about 3300 angstroms to 5100 angstroms, for instance. The passivation layer is further disposed between the pixel electrode PE' and the active device T' (the source S' and the drain D'). The passivation layer has a contact opening V', such that the pixel electrode PE' is electrically connected to the drain D'.

In the embodiment depicted in FIG. 4, the capacitor electrode CL' is located between the gate G' and the drain D', and the overlapping region between the capacitor coupling portion 110b' of the capacitor electrode CL' and the drain D' is where the storage capacitor of the pixel structure is formed. The gate G' and the drain D' of the active device T' are located at the non-light-transmissive region. Hence, compared to the capacitor electrode in the conventional storage capacitor, the capacitor electrode CL' of this embodiment can ensure the desired aperture ratio of the pixel structure. Moreover, the capacitor electrode CL' disposed between the gate G' and the drain D' is conducive to reduction of parasitic capacitance Cgd between the gate G' and the drain D'. Thereby, the coupling effect occurring between the gate G' and the drain D' can be mitigated, and the display quality of the image can be improved, e.g., flickers can be reduced.

In this embodiment, the second insulating layer is thin enough, such that the storage capacitor can have sufficient storage capacitance even through the area of the capacitor electrode CL' is reduced for the purpose of increasing the aperture ratio of the pixel structure. The capacitor electrode CL' is located between the gate G' and the drain D' and covers a portion of the gate G'. Therefore, the capacitor electrode CL' can block light from the backlight module, so as to decrease the photo current leakage generated when the channel CH' is irradiated by the light from the backlight source.

In the pixel structures described in the above embodiments, the active devices are bottom-gate thin film transistors, for instance. However, the present invention is not limited thereto. In other embodiments of the present invention, the active devices of the pixel structures can also be top-gate thin film transistors, as described below.

Figure 5:
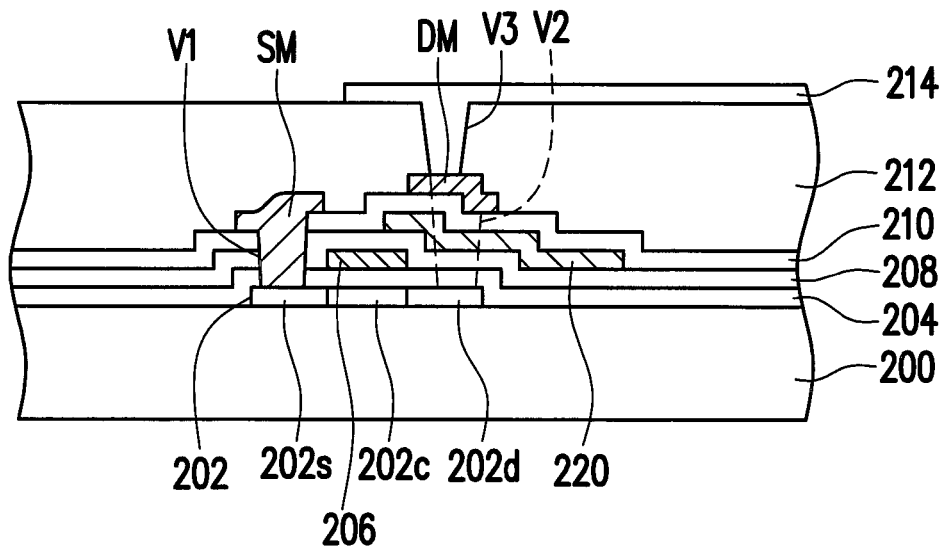
FIG. 5 is a schematic cross-sectional view illustrating a pixel structure according to an embodiment of the present invention.

FIG. 5 is a schematic cross-sectional view illustrating a pixel structure according to an embodiment of the present invention. With reference to FIG. 5, the active device of the pixel structure includes a polysilicon layer 202 that is disposed on the substrate 200, a gate 206, a first insulating layer 204, an auxiliary dielectric layer 208, a second insulating layer 210, a source SM, a drain DM, a capacitor electrode 220, and a pixel electrode 214. The polysilicon layer 202, the gate 206, the source SM, and the drain DM together constitute the active device.

The polysilicon layer 202 has a source region 202s, a drain region 202d, and a channel region 202c. The source region 202s and the drain region 202d are n-type ion doped region or p-type ion doped region, for example.

The first insulating layer 204 covers the polysilicon layer 202 and/or the substrate 200. The material of the first insulating layer 204 includes silicon oxide, silicon nitride, silicon oxynitride, or any other appropriate dielectric material.

The gate 206 is disposed on the first insulating layer 204 above the channel region 202c. The gate 206 is electrically connected to the scan line (not shown). The material of the gate 206 is, for example, metal, an alloy, metal nitride, metal oxide, metal oxynitride, another appropriate material, or a layer in which the metallic material and any other conductive material are stacked to each other.

The auxiliary dielectric layer 208 covers the gate 206 and the first insulating layer 204. The material of the auxiliary layer 208 includes silicon oxide, silicon nitride, silicon oxynitride, or any other appropriate dielectric material.

The capacitor electrode 220 is disposed on the auxiliary dielectric layer 208. The material of the capacitor electrode 220 is, for example, metal, an alloy, metal nitride, metal oxide, metal oxynitride, another appropriate material, or a layer in which the metallic material and any other conductive material are stacked to each other.

The second insulating layer 210 covers the capacitor electrode 220. The material of the second insulating layer 210 includes silicon oxide, silicon nitride, silicon oxynitride, or any other appropriate dielectric material.

The source SM and the drain DM are disposed on the second insulating layer 210. The source SM is electrically connected to the data line (not shown). The source SM and the drain DM, for example, are made of metal, an alloy, metal nitride, metal oxide, metal oxynitride, another appropriate material, or a layer in which the metallic material and any other conductive material are stacked to each other. The source SM and the drain DM are electrically connected to the source region 202s and the drain region 202d respectively through contact openings V1 and V2. Namely, the contact openings V1 and V2 penetrate the second insulating layer 210, the auxiliary dielectric layer 208, and the first insulating layer 204, such that the source SM and the drain DM can be electrically connected the source region 202s and the drain 202d respectively through the contact openings V1 and V2.

Specifically, the capacitor electrode 220 is located between the gate 206 and the drain DM. An overlapping region between the capacitor electrode 220 and the drain DM is where the storage capacitor of the pixel structure is formed. Namely, the capacitor electrode 220 acts as the lower electrode of the storage capacitor, and the drain DM acts as the upper electrode of the storage capacitor. The capacitor electrode 220 of this embodiment is located between the gate 206 and the drain DM, and the gate 206 and the drain DM are not light transmissive, for example. Therefore, thanks to the arrangement of the capacitor electrode 220 between the gate 206 and the drain DM, the area of the capacitor region of the pixel structure can be reduced. That is to say, compared to the capacitor electrode in the conventional storage capacitor, the capacitor electrode 220 of this embodiment can ensure the desired aperture ratio of the pixel structure. Moreover, since the capacitor electrode 220 in the present invention is disposed between the gate 206 and the drain DM, the parasitic capacitance Cgd between the gate 206 and the drain DM can be further reduced, so as to improve the image quality.

The passivation layer 212 covers the source SM and the drain DM. The material of the passivation layer 212 can be an inorganic insulating material (e.g., silicon nitride, silicon oxide, silicon oxynitride), an organic insulating material, an organic photo-sensitive material, or any other material.

The pixel electrode 214 is disposed on the passivation layer 212 and electrically connected to the drain DM through the contact opening V3. In other words, the contact opening V3 penetrates the passivation layer 212, such that the pixel electrode 214 is electrically connected to the drain DM through the contact opening V3.

Figure 6:
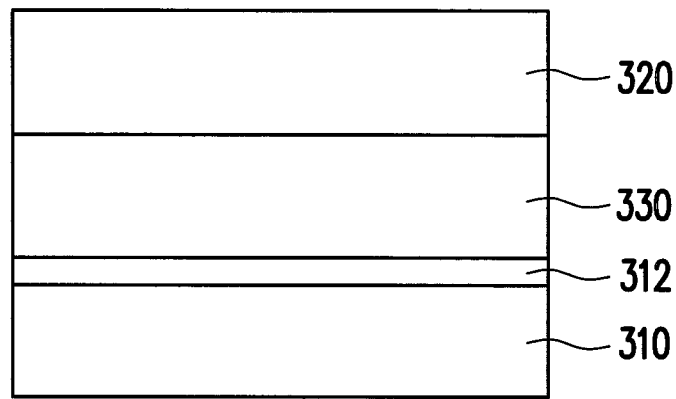
FIG. 6 is a schematic cross-sectional view illustrating a display panel according to an embodiment of the present invention.

FIG. 6 is a schematic cross-sectional view illustrating a display panel according to an embodiment of the present invention. With reference to FIG. 6, the display panel includes a first substrate 310, a pixel array 312, a second substrate 320, and a display medium 330. The pixel array 312 is disposed on the first substrate 310 and includes a plurality of pixel structures. Here, the pixel structures can be referred to as any of the pixel structures described in the embodiments shown in FIG. 1 to FIG. 5. The second substrate 320 can be a blank substrate, a color filter substrate, or a substrate on which an electrode layer is disposed. The display medium 330 can be liquid crystal molecules, an electrophoretic display medium, or any other suitable display medium.

In light of the foregoing, according to the present embodiment, the capacitor electrode is disposed between the gate and the drain in the present invention, so as not to reduce the area of the light transmissive region of the pixel structure. Hence, compared to the capacitor electrode in the conventional storage capacitor, the capacitor electrode of the present invention can ensure the desired aperture ratio of the pixel structure.

Moreover, since the capacitor electrode in the present invention is disposed between the gate and the drain, the parasitic capacitance Cgd between the gate and the drain can be further reduced, so as to improve the image quality. On the other hand, the second insulating layer is thin enough, such that the storage capacitor can have sufficient storage capacitance even through the area of the capacitor electrode is reduced for the purpose of increasing the aperture ratio of the pixel structure.

Additionally, the capacitor electrode is located between the gate and the drain and covers a portion of the channel. Accordingly, the capacitor electrode can block light that comes from the back side of the substrate, e.g., the light of the backlight module, so as to effectively decrease the photo current leakage generated when the channel is irradiated by the light from the backlight source. Further, since the capacitor coupling portion which does not occupy large area is not overlapped with the data line, said design of the capacitor electrode does not increase the loading of the pixel structure.

Second Embodiment

Figure 7:
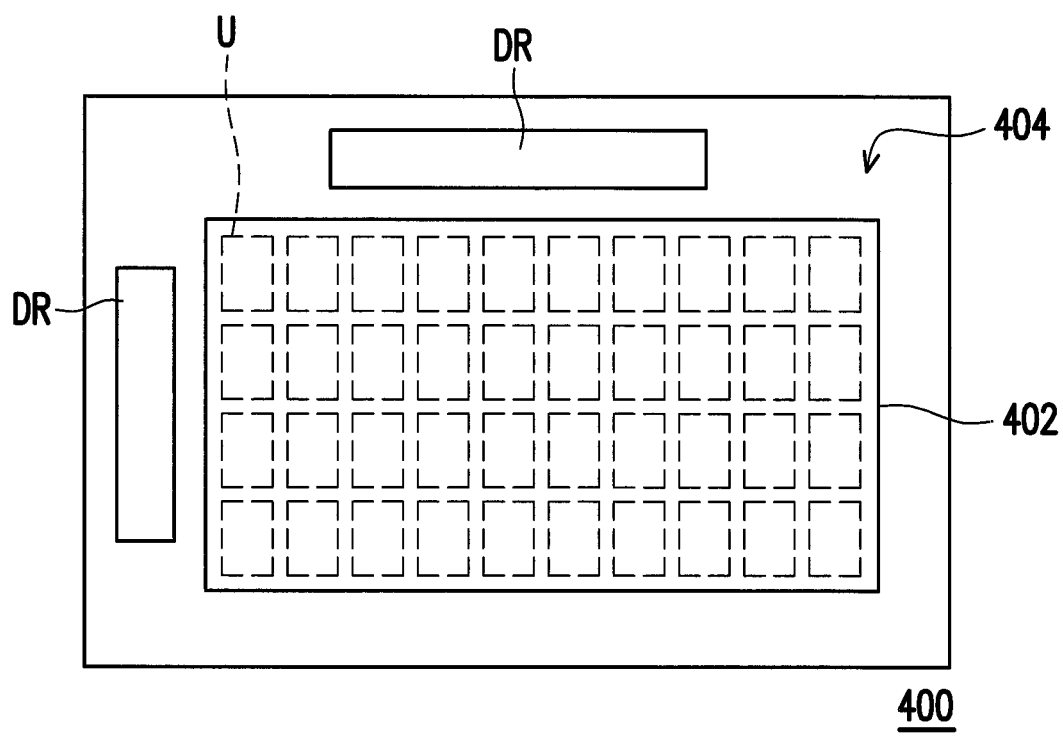
FIG. 7 is a schematic top view illustrating a display panel according to an embodiment of the present invention.
Figure 8:
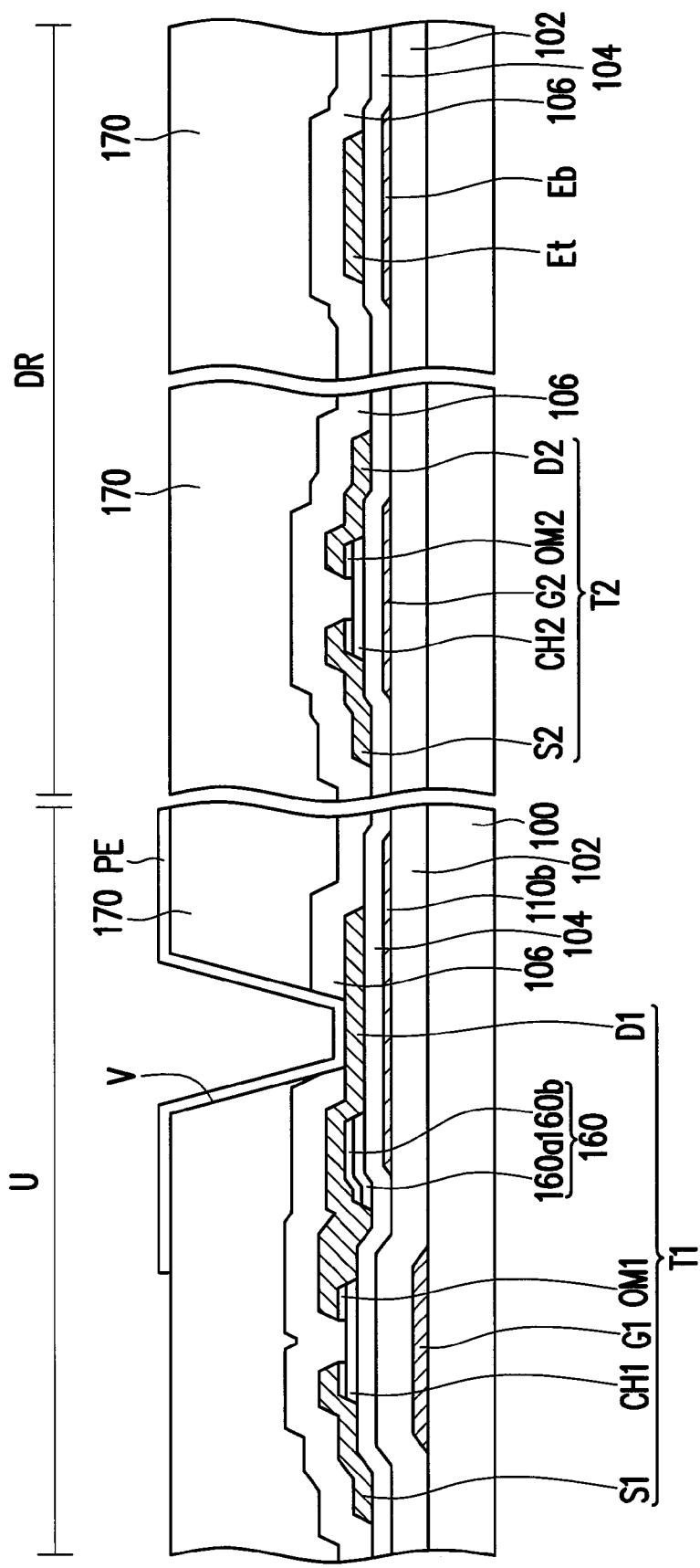
FIG. 8 is a schematic cross-sectional view showing a pixel structure and a driving circuit of the display panel of FIG. 7.

FIG. 7 is a schematic top view illustrating a display panel according to an embodiment of the present invention. FIG. 8 is a schematic cross-sectional view showing a pixel structure and a driving circuit of the display panel of FIG. 7. Referring to FIG. 7 and FIG. 8, the display panel 400 has a display region 402 and a non-display region 404, the display region 402 of the display panel 400 has a plurality of pixel regions U, and the non-display region 404 of the display panel 400 has at least one driving circuit DR. The non-display region 404 substantially surrounds the display region 402. The driving circuit DR is disposed at one side, two sides or three sides of the display region 402 or around the display region 402. In the embodiment, the driving circuit DR is disposed at two sides of the display region 402 for illustration, and it does not limit the present invention.

The plurality of pixel regions U of the display region 402 are arranged into an array, and each of the pixel regions U has one pixel structure therein. Hence, the display region 402 has a plurality of pixel structures arranged into an array therein.

The pixel structure disposed in the pixel region U can be any one pixel structure as described in the above embodiments. Namely, the pixel structure disposed in the pixel region U can be the pixel structure shown in FIG. 1A and FIG. 1B, the pixel structure shown in FIG. 2A and FIG. 2B, the pixel structure shown in FIG. 3A and FIG. 3B, the pixel structure shown in FIG. 4, or the pixel structure shown in FIG. 5. In the embodiment, the pixel structure shown in FIG. 2A and FIG. 2B is described for illustration, and it does not limit the present invention.

According to the embodiment, the pixel structure in the pixel region U comprises a first active T1 and a pixel electrode PE. The first active device T1 includes a first gate G1, a first channel CH1, a first source S1, and a first drain D1. The first gate G1 is electrically connected to the scan line (not shown in FIG. 8), and the first source S1 is electrically connected to the data line (not shown in FIG. 8). The materials of the first gate G1, the first channel CH1, the first source S1 and the first drain D1 are similar to or the same with the gate G, the channel CH, the source S and the drain D as described in the first embodiment and repetitive descriptions of these elements are omitted hereinafter. In addition, an ohmic contact layer OM1 may further be disposed between the first channel CH1 and the first source S1/first drain D1. The pixel electrode PE is electrically connected to the first drain D1 of the first active device T1.

It is noted, as shown in FIG. 8, the first insulating layer 102 and the second insulating layer 104 are disposed between the first gate G1 and the first channel CH1, and the first insulating layer 102 and the second insulating layer 104 between the first gate G1 and the first channel CH1 serve as a gate insulating layer of the first active device T1. The insulating layer 102 and the second insulating layer 104 respectively include silicon oxide, silicon nitride, silicon oxynitride, or any other appropriate dielectric material. A total thickness of the first insulating layer 102 and the second insulating layer 104 (the gate insulating layer) is about 3300 angstroms to about 5100 angstroms, for instance.

In addition, each pixel region U further comprises a capacitor electrode CL (the capacitor coupling portion 110b). The film layer where the capacitor electrode CL (the capacitor coupling portion 110b) is located is between the film layer where the gate G is located and the film layer where the drain D is located. An overlapping region between the capacitor electrode CL (the capacitor coupling portion 110b) and the first drain D1 is where the storage capacitor of the pixel structure is formed. Namely, the capacitor electrode CL (the capacitor coupling portion 110b) acts as a lower electrode of the storage capacitor, and the first drain D acts as an upper electrode of the storage capacitor. The second insulating layer 104 between the capacitor electrode CL (the capacitor coupling portion 110b) and the first drain D1 serves as a capacitor dielectric layer of the storage capacitor. Here, the thickness of the second insulating layer 104 (the capacitor dielectric layer) is about 700 angstroms to about 1500 angstroms.

The driving circuit DR disposed in the non-display region 404 is, for example, a gate driving circuit, a source driving circuit, or both of the gate driving circuit and the source driving circuit. In particular, the driving circuit DR comprises at least one second active device T2 which comprises a second gate G2, a second channel CH2, a second source S2 and a second drain D2. The materials of the second channel CH2, a second source S2 and a second drain D2 are similar to or the same with the channel CH, the source S and the drain D as described in the first embodiment, the material of the second gate G2 is similar to or the same with the capacitor electrode CL as described in the first embodiment, and repetitive descriptions of these elements are omitted hereinafter. In addition, an ohmic contact layer OM2 may further be disposed between the second channel CH2 and the second source S2/second drain D2.

It is noted that, as shown in FIG. 8, the second gate G2 is disposed on the first insulating layer 102, and the second insulating layer 104 covers the second gate G2. Therefore, the second insulating layer 104 is disposed between the second gate G2 and the second channel CH2, and the second insulating layer 104 between the second gate G2 and the second channel CH2 serves as a gate insulating layer of the second active device T2. Here, the thickness of the second insulating layer 104 is about 700 angstroms to about 1500 angstroms.

According to the embodiment, the driving circuit DR may further comprise a capacitor. The capacitor comprises a lower electrode Eb and an upper electrode Et. The lower electrode Eb is disposed on the first insulating layer 102, and the second insulating layer 104 covers the lower electrode Eb. Here, the lower electrode Eb and the capacitor electrode (the capacitor coupling portion 110b) are in the same film layer. In addition, the upper electrode Et is disposed on the second insulating layer 104 above the lower electrode Eb. Here, the upper electrode Et, the first source S1/first drain D1 of the first active device T1, and the second source S2/second drain D2 of the second active device T2 are in the same film layer. In the embodiment, the capacitor of the driving circuit DR is comprised of the lower electrode Eb, the upper electrode Et, and the second insulating layer 104 (the capacitor electric layer).

In the embodiment, the second insulating layer 104 acts as the gate insulating layer of the second active device T2 of the driving circuit DR. Since the second insulating layer 104 is thin enough, a drain current of the second active device T2 can be increased. Accordingly, an area of the second active device T2 can be reduced on the basis of maintaining the performance of an active device, and thereby the driving circuit DR having the second active device T2 can be applied to a slim border display panel.

In addition, the second insulating layer 104 acts as the capacitor dielectric layer of the capacitor of the driving circuit DR. Since the second insulating layer 104 is thin enough, a storage capacitance of the capacitor can be increased. Therefore, an area of the capacitor can be reduced on the basis of maintaining the storage capacitance of the capacitor, and thereby the driving circuit DR having the capacitor can be applied to a slim border display panel.

Figure 9:
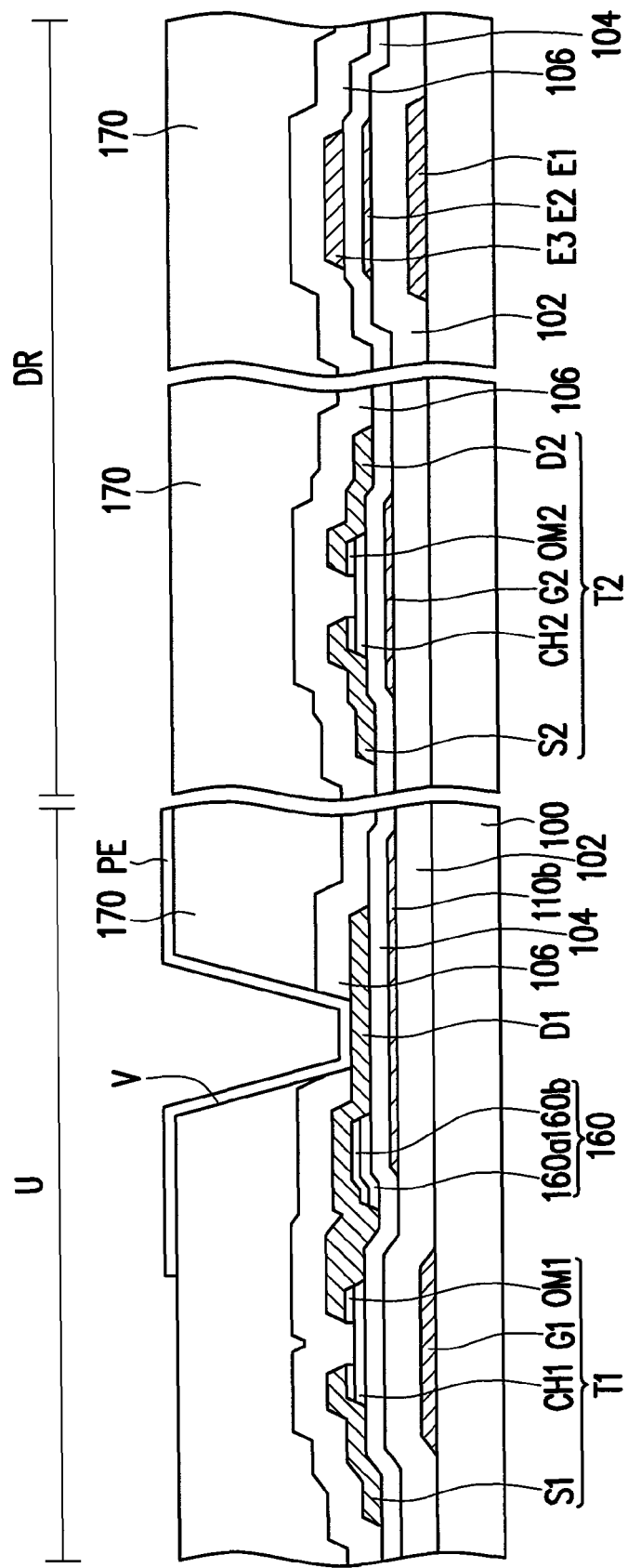
FIG. 9 is a schematic cross-sectional view showing a pixel structure and a driving circuit of the display panel according to another embodiment of the present invention.

FIG. 9 is a schematic cross-sectional view showing a pixel structure and a driving circuit of the display panel according to another embodiment of the present invention. The embodiment depicted in FIG. 9 is similar to the embodiment depicted in FIG. 8; therefore, the same elements in FIG. 8 and FIG. 9 are represented by the same reference numbers and repetitive descriptions of these elements are omitted hereinafter. The difference between the embodiment depicted in FIG. 9 and the embodiment depicted in FIG. 8 lies in that the capacitor comprises a first electrode E1, a second electrode E2 and a third electrode E3. Here, the second electrode E2 is equal to the lower electrode Eb shown in FIG. 8, and the third electrode E3 is equal to the upper electrode Et shown in FIG. 8. In the embodiment, the first electrode E1 is further disposed under the second electrode E2. Therefore, the first electrode E1 is disposed on the substrate 100, and the first insulating layer 102 covers the first electrode E1. The second electrode E2 is disposed on the first insulating layer 102, and the second insulating layer 104 covers the second electrode E2. The third electrode E3 is disposed on the second insulating layer 104 above the second electrode E2.

Accordingly, the capacitor is formed by two sub-capacitors connected in parallel, such that the storage capacitance of the capacitor can be increased. Similarly, an area of the capacitor (the first electrode E1, the second electrode E2 and the third electrode E3) can be reduced on the basis of maintaining the storage capacitance of the capacitor, and thereby the driving circuit DR having the capacitor can be applied to a slim border display panel.

Third Embodiment

Figure 10:
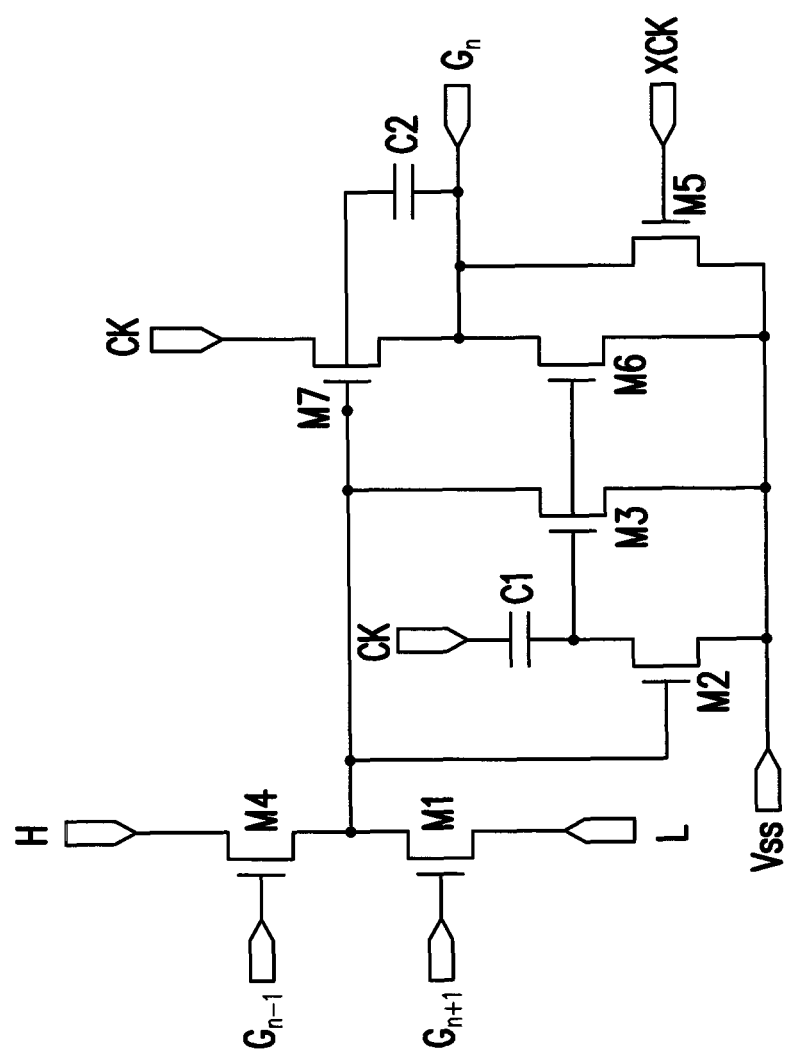
FIG. 10 is a schematic drawing showing a driving circuit according to an embodiment of the present invention.
Figure 11:
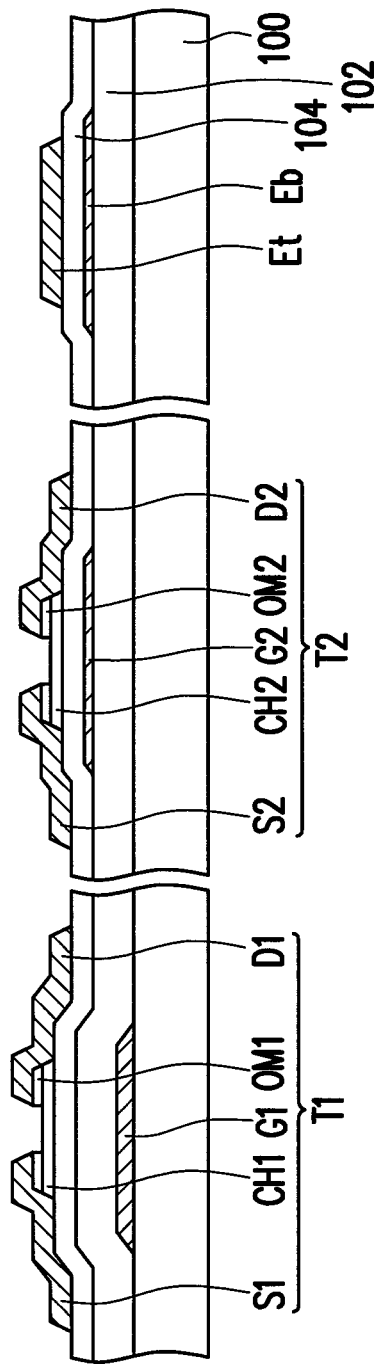
FIG. 11 is a schematic cross-sectional view showing a portion of an active device and a capacitor of the driving circuit in FIG. 10.

FIG. 10 is a schematic drawing showing a driving circuit according to an embodiment of the present invention. FIG. 11 is a schematic cross-sectional view showing a portion of an active device and a capacitor of the driving circuit in FIG. 10. Referring to FIG. 10, the driving circuit of the embodiment may be applied to the driving circuit DR shown in FIG. 7, the driving circuit DR of the embodiment is a gate driving circuit for illustration, and it does not limit the present invention. In the embodiment, the driving circuit comprises a plurality of active devices M1~M7 and a plurality of capacitors C1~C2. Furthermore, the scan line Gn is electrically connected to the active devices M6, M7 and the capacitor C2, the scan line Gn+1 and the scan line Gn−1 are respectively electrically connected to the active devices M1, M4, the data line Vss is electrically connected to the active device M2, the clock signal line CK is electrically connected to the active device M7 and the capacitor C1, the signal lines H, L are respectively electrically connected to the active devices M4m M1, and the signal line XCK is electrically connected to the active device M5.

The active device T1 and the active device T2 of FIG. 11 may form the active devices M1~M7 of the driving circuit in FIG. 10. Namely, a portion of the active devices M1~M7 have a structure of the active device T1 as shown FIG. 11 and another portion of the active devices M1~M7 have a structure of the active device T2 as shown FIG. 11.

Referring to FIG. 11, the first active device T1 includes a first gate G1, a first channel CH1, a first source S1, and a first drain D1. In addition, an ohmic contact layer OM1 may further be disposed between the first channel CH1 and the first source S1/first drain D1. Moreover, the first insulating layer 102 and the second insulating layer 104 are disposed between the first gate G1 and the first channel CH1, and the first insulating layer 102 and the second insulating layer 104 between the first gate G1 and the first channel CH1 serve as a gate insulating layer of the first active device T1. The insulating layer 102 and second insulating layer 104 respectively include silicon oxide, silicon nitride, silicon oxynitride, or any other appropriate dielectric material. A total thickness of the first insulating layer 102 and the second insulating layer 104 (the gate insulating layer) is about 3300 angstroms to about 5100 angstroms, for instance.

The second active device T2 comprises a second gate G2, a second channel CH2, a second source S2 and a second drain D2. In addition, an ohmic contact layer OM2 may further be disposed between the second channel CH2 and the second source S2/second drain D2. Here, the second gate G2 is disposed on the first insulating layer 102, and the second insulating layer 104 covers the second gate G2. Therefore, the second insulating layer 104 is disposed between the second gate G2 and the second channel CH2, and the second insulating layer 104 between the second gate G2 and the second channel CH2 serves as a gate insulating layer of the second active device T2. The thickness of the second insulating layer 104 is about 700 angstroms to about 1500 angstroms.

The capacitors C1, C2 respectively comprise a lower electrode Eb and an upper electrode Et. The lower electrode Eb is disposed on the first insulating layer 102, and the second insulating layer 104 covers the lower electrode Eb. The upper electrode Et is disposed on the second insulating layer 104 above the lower electrode Eb. Therefore, the capacitors C1, C2 are comprised of the lower electrode Eb, the upper electrode Et, and the second insulating layer 104 (the capacitor electric layer).

Accordingly, the first insulating layer 102 and the second insulating layer 104 act as the gate insulating layer of the first active device T1, and thus the first active device T1 can be applied to the active device which needs a thicker gate insulating layer in the driving circuit DR. Moreover, the second insulating layer 104 acts as the gate insulating layer of the second active device T2. Since the second insulating layer 104 is thin enough, a drain current of the second active device T2 can be increased. Accordingly, an area of the second active device T2 can be reduced on the basis of maintaining the performance of an active device, so as to reduce a total area of the driving circuit DR.

In addition, the second insulating layer 104 acts as the capacitor dielectric layer of the capacitors C1, C2. Since the second insulating layer 104 is thin enough, a storage capacitance of the capacitor can be increased. Therefore, areas of the capacitors C1, C2 can be reduced on the basis of maintaining the storage capacitance of the capacitors, so as to reduce a total area of the driving circuit DR.

Figure 12:
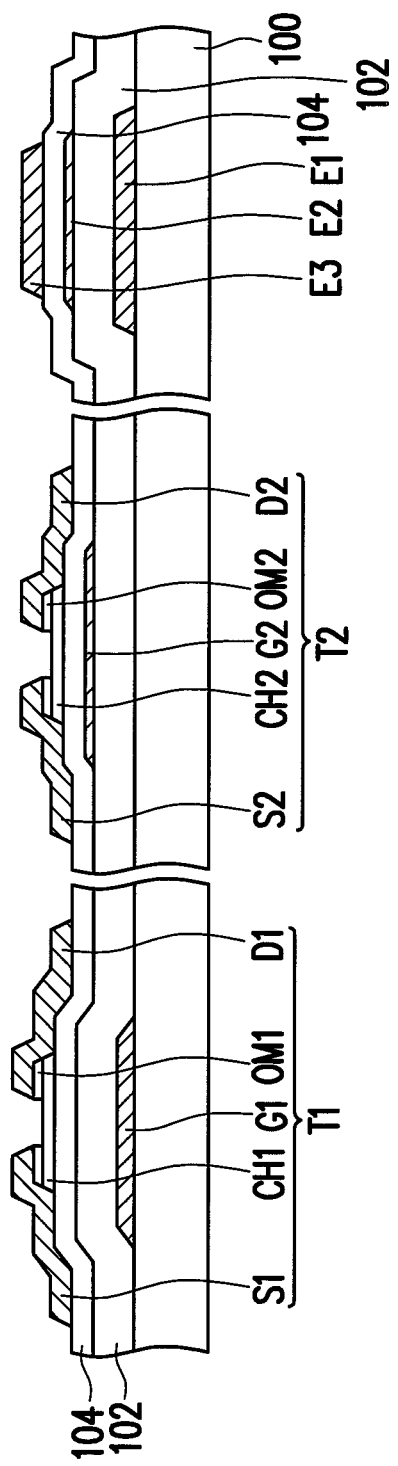
FIG. 12 is a schematic cross-sectional view showing a portion of an active device and a capacitor of the driving circuit according to another embodiment of the present invention.

FIG. 12 is a schematic cross-sectional view showing a portion of an active device and a capacitor of the driving circuit according to another embodiment of the present invention. The embodiment depicted in FIG. 12 is similar to the embodiment depicted in FIG. 11; therefore, the same elements in FIG. 11 and FIG. 12 are represented by the same reference numbers and repetitive descriptions of these elements are omitted hereinafter. The difference between the embodiment depicted in FIG. 12 and the embodiment depicted in FIG. 11 lies in that the capacitors C1, C2 comprise a first electrode E1, a second electrode E2 and a third electrode E3. Here, the second electrode E2 is equal to the lower electrode Eb shown in FIG. 11, and the third electrode E3 is equal to the upper electrode Et shown in FIG. 11. In the embodiment, the first electrode E1 is further disposed under the second electrode E2. Therefore, the first electrode E1 is disposed on the substrate 100, and the first insulating layer 102 covers the first electrode E1. The second electrode E2 is disposed on the first insulating layer 102, and the second insulating layer 104 covers the second electrode E2. The third electrode E3 is disposed on the second insulating layer 104 above the second electrode E2.

Accordingly, the capacitors are respectively formed by two sub-capacitors connected in parallel, such that the storage capacitances of the capacitors can be increased. Similarly, areas of the capacitors (the first electrode E1, the second electrode E2 and the third electrode E3) can be reduced on the basis of maintaining the storage capacitances of the capacitors, so as to reduce a total area of the driving circuit DR.

It will be apparent to those skilled in the art that various modifications and variations can be made to the present invention without departing from the scope or spirit of the present invention. In view of the foregoing, it is intended that the present invention cover modifications and variations of the present invention provided they fall within the scope of the following claims and their equivalents.

What is claimed is:

1. A driving circuit, comprising:
   a first gate;
   a first insulating layer covering the first gate;
   a second gate disposed on the first insulating layer;
   a second insulating layer covering the first insulating layer and the second gate;
   a first channel disposed on the second insulating layer above the first gate;
   a second channel disposed on the second insulating layer above the second gate;
   a first source and a first drain located on the first channel; and
   a second source and a second drain located on the second channel.

2. The driving circuit as claimed in claim 1, wherein a thickness of the second insulating layer is smaller than a thickness of the first insulating layer, the thickness of the second insulating layer is about 700 angstroms to about 1500 angstroms, and a total thickness of the first insulating layer and the second insulating is about 3300 angstroms to about 5100 angstroms.

3. The driving circuit as claimed in claim 1, further comprising a capacitor, and the capacitor comprises:
   a lower electrode disposed on the first insulating layer, and the second insulating layer covers the lower electrode; and
   an upper electrode disposed on the second insulating layer above the lower electrode.

4. The driving circuit as claimed in claim 1, further comprising a capacitor, and the capacitor comprises:
   a first electrode, wherein the first insulating layer covers the first electrode;
   a second electrode disposed on the first insulating layer, and the second insulating layer covers the first electrode; and
   a third electrode disposed on the second insulating layer above the second electrode.

5. A display panel having a display region and a non-display region, the display panel comprising:
   a plurality of pixel structures disposed in the display region, each pixel structure comprising:
      a scan line and a data line;
      a first active device including a first gate, a first channel, a first source, and a first drain, wherein the first gate is electrically connected to the scan line, and the first source is electrically connected to the data line;
      a pixel electrode electrically connected to the first drain;
      a first insulating layer located between the first gate and the first channel;
      a capacitor electrode located on the first insulating layer; and
      a second insulating layer covering the first insulating layer and the capacitor electrode, and the second insulating layer is located between the capacitor electrode and the first drain; and
   at least one driving circuit disposed in the non-display region and comprising at least one second active device, wherein the second active device comprises:
      a second gate disposed on the first insulating layer, and the second insulating layer covers the second gate;
      a second channel located on the second insulating layer above the second gate; and
      a second source and a second drain disposed on the second channel.

6. The display panel as claimed in claim 5, further comprising a capacitor disposed in the non-display region, and the capacitor comprises:
   a lower electrode disposed on the first insulating layer, and the second insulating layer covers the lower electrode; and
   an upper electrode disposed on the second insulating layer above the lower electrode.

7. The display panel as claimed in claim 5, further comprising a capacitor disposed in the non-display region, and the capacitor comprises:
   a first electrode, wherein the first insulating layer covers the first electrode;
   a second electrode disposed on the first insulating layer, and the second insulating layer covers the second electrode; and
   a third electrode disposed on the second insulating layer above the second electrode.

* * * * *